(12) United States Patent
Perera

(10) Patent No.: US 8,531,403 B2
(45) Date of Patent: Sep. 10, 2013

(54) KEYBOARD FOR USE IN COMPUTER SYSTEM

(76) Inventor: Malawalaarachchige Tissa Perera, Singapore (SG)

( * ) Notice: Subject to any disclaimer, the term of this patent is extended or adjusted under 35 U.S.C. 154(b) by 1275 days.

(21) Appl. No.: 12/226,238

(22) PCT Filed: Apr. 5, 2007

(86) PCT No.: PCT/SG2007/000092
§ 371 (c)(1),
(2), (4) Date: Oct. 10, 2008

(87) PCT Pub. No.: WO2007/120114
PCT Pub. Date: Oct. 25, 2007

(65) Prior Publication Data
US 2009/0289898 A1 Nov. 26, 2009

(30) Foreign Application Priority Data

Apr. 13, 2006 (SG) .................................. 200602466-5

(51) Int. Cl.
*G09G 5/00* (2006.01)

(52) U.S. Cl.
USPC ........... 345/168; 345/156; 345/160; 345/171; 345/172; 341/22; 341/28; 455/550; 455/566

(58) Field of Classification Search
USPC .................. 345/156–172, 173, 179; 455/566, 455/550; 400/109, 110, 477, 489; 700/14, 700/17, 84; 341/22, 26, 28, 182
See application file for complete search history.

(56) References Cited

U.S. PATENT DOCUMENTS

| 5,818,437 | A | 10/1998 | Grover et al. |
| 6,392,640 | B1* | 5/2002 | Will .............................. 345/184 |
| 6,636,162 | B1 | 10/2003 | Kushler et al. |
| 7,202,802 | B2* | 4/2007 | Salman et al. .................. 341/22 |
| 7,953,448 | B2* | 5/2011 | Pletikosa et al. .............. 455/564 |
| 2001/0005199 | A1* | 6/2001 | Anderson ..................... 345/168 |
| 2003/0001821 | A1 | 1/2003 | Sheperd et al. |
| 2007/0143262 | A1* | 6/2007 | Kasperski ......................... 707/3 |
| 2007/0171207 | A1* | 7/2007 | Wernersson .................. 345/169 |
| 2007/0188472 | A1* | 8/2007 | Ghassabian ................... 345/169 |

FOREIGN PATENT DOCUMENTS

WO WO 00/62150 10/2000
WO WO 02/35336 A1 5/2002

OTHER PUBLICATIONS

International Search Report dated Aug. 8, 2007, from PCT Application No. PCT/SG2007/000092.
Written Opinion of International Searching Authority dated Aug. 8, 2007, from PCT Application No. PCT/SG2007/000092.
International Preliminary Examination Report dated Jun. 24, 2008, from PCT Application No. PCT/SG2007/000092.

* cited by examiner

*Primary Examiner* — Quan-Zhen Wang
*Assistant Examiner* — Jennifer Nguyen
(74) *Attorney, Agent, or Firm* — Kilyk & Bowersox, P.L.L.C.

(57) ABSTRACT

A computer system having a computer and a keyboard is provided. The keyboard includes a plurality of first letter keys and respective second letter keys. Each of the first and second letter keys is associated with a respective letter. The computer system is arranged: (i) upon activation of one of the first letter keys to register the selection of the corresponding letter; and (ii) upon activation of one of the second letter keys to present to a user a predefined list of one or more words. The words of each list are associated with the corresponding letter. The computer system is further arranged to register a selection by the user of one of the presented words.

14 Claims, 5 Drawing Sheets

KEYBOARD FOR USE IN COMPUTER SYSTEM

CROSS-REFERENCE TO RELATED APPLICATIONS

The present application is a U.S. National Stage filing derived from PCT/SG2007/000092, filed Apr. 5, 2007, which claims priority from Singapore Application No. 200602466-5, filed Apr. 13, 2006, which are both incorporated herein in their entireties by reference.

TECHNICAL FIELD

The present invention relates to computer systems and more particularly to a keyboard for use in a computer system.

BACKGROUND TO THE INVENTION AND PRIOR ART

A keyboard functions primarily as an input device, translating a user's keystrokes into signals which a computer can understand. The keyboard is often used to input content into an application program on a computer system. Typically, this involves typing out all the characters in the content in turn which can be time-consuming. Hence, a need exists for quicker way to input character content into an application program on a computer system.

In view of the foregoing, it would be desirable to have a keyboard for use in a computer system that facilitates entry of character content into an application program on a computer system.

SUMMARY OF EMBODIMENTS OF THE INVENTION

Accordingly, in a first aspect the invention provides a computer system having a computer and a keyboard, the keyboard having a plurality of first letter keys and respective second letter keys, each of the first and second letter keys being associated with a respective letter; the computer system being arranged: (i) upon activation of one of the first letter keys to register the selection of the corresponding letter; and (ii) upon activation of one of the second letter keys to present to a user a predefined list of one or more words, the words of each list being associated with the corresponding letter, the computer system being arranged to register a selection by the user of one of the presented words. Selection of one or more words from the predefined list presented to the user facilitates entry of character content into an application program on the computer system.

Preferably, the computer system is operative to register instructions to alter the list of words associated with any of the letters, and upon receiving such instructions, to alter the list of words accordingly. This allows the user to customise the presented list of words to suit his individual needs.

Preferably, each of the letters is associated with a corresponding plurality of word lists, each word of each word list being associated with the corresponding letter, the computer system being arranged upon selection of one the letters, to register at least one command indicating a selection of one of the word lists associated with that letter, and to present the user with the selected word list such that the user can make a selection from the selected word list. This allows the user to group the words associated with each letter according to genre. Each of the word lists preferably is associated with a name, the names being editable.

In a second aspect, the invention further provides a computer system having a computer and a keyboard, the keyboard having a plurality of first letter keys and respective second letter keys, each of the first and second letter keys being associated with a respective letter; the computer system being arranged: (i) upon activation of one of the first letter keys to register the selection of a corresponding letter; and (ii) upon activation of one of the second letter keys to present to a user a predefined list of one or more words, the words of each list beginning with the corresponding letter, the computer system being arranged to register a selection by the user of one of the presented words.

Optionally, the computer system may be arranged to have a mode of operation in which the second letters keys are deactivated. This mode of operation may be useful, for example, when an experienced typist is using the keyboard, particularly a typist who is not familiar with the second letter keys. The deactivated mode may be entered by activating a special key. Alternatively, it may be entered by the user issuing a command to software running on the computer system. The second keys may be re-activated when desired (i.e. the deactivated mode can be turned off), e.g. by activating the special key again.

In a third aspect, the invention further provides a computer system having a computer and a keyboard, the keyboard having letter keys associated with corresponding letters, the computer system being arranged to have first mode of operation in which upon activation of one of the letter keys the computer system registers the selection of a corresponding letter, and a second mode of operation in which upon activation of one of the letter keys the computer system presents to a user a predefined list of one or more words, the words being associated with the corresponding letter, the computer system being arranged to register a selection by the user of one of the presented words.

The second mode of operation may be entered by the user performing an activity which involves the key to be activated (for example, holding the key for more than a predefined time). Alternatively or additionally, the second mode of operation may be entered by an activity which does not involve the activated key (e.g. by activating another key, such as a key which is analogous to the control or shift keys). The second mode of operation may be ended as soon as the key is activated.

In the second and third aspects, corresponding advantages are obtained as previously described in respect of the first aspect. Moreover, corresponding further features as described above in respect of the first aspect may also be employed.

In a fourth aspect, the invention further provides a keyboard having a plurality of first letter keys and respective second letter keys, each of the first and second letter keys being associated with a respective letter, whereby when the keyboard is used as part of a computer system, the computer system can be arranged: (i) upon activation of one of the first letter keys to register the selection of a corresponding letter; and (ii) upon activation of one of the second letter keys to present to a user a corresponding list of one or more words, and to register a selection by the user of one of the presented words. Preferably, the list of words corresponding to each letter are words which begin with the corresponding letter.

In a preferred embodiment, the keyboard further comprises one or more third keys, each third key being associated with a set of data include multiple letters, whereby the keyboard can be used as part of a computer system which is arranged, upon user activation of one of the keys to register a selection of the corresponding data set. Preferably, at least one of the datasets comprises at least one name, address, telephone Number, and/or email address.

In the fourth aspect, corresponding advantages are obtained as previously described in respect of the first aspect.

Other aspects and advantages of the invention will become apparent from the following detailed description, taken in conjunction with the accompanying drawings, illustrating by way of example the principles of the invention.

BRIEF DESCRIPTION OF THE DRAWINGS

The following detailed description of preferred embodiments of the invention will be better understood when read in conjunction with the appended drawings. The present invention is illustrated by way of example and is not limited by the accompanying figures, in which like references indicate similar elements.

DETAILED DESCRIPTION OF THE PREFERRED EMBODIMENTS

The detailed description set forth below in connection with the appended drawings is intended as a description of the presently preferred embodiments of the invention, and is not intended to represent the only form in which the present invention may be practiced. It is to be understood that the same or equivalent functions may be accomplished by different embodiments that are intended to be encompassed within the spirit and scope of the invention.

Figure 1:
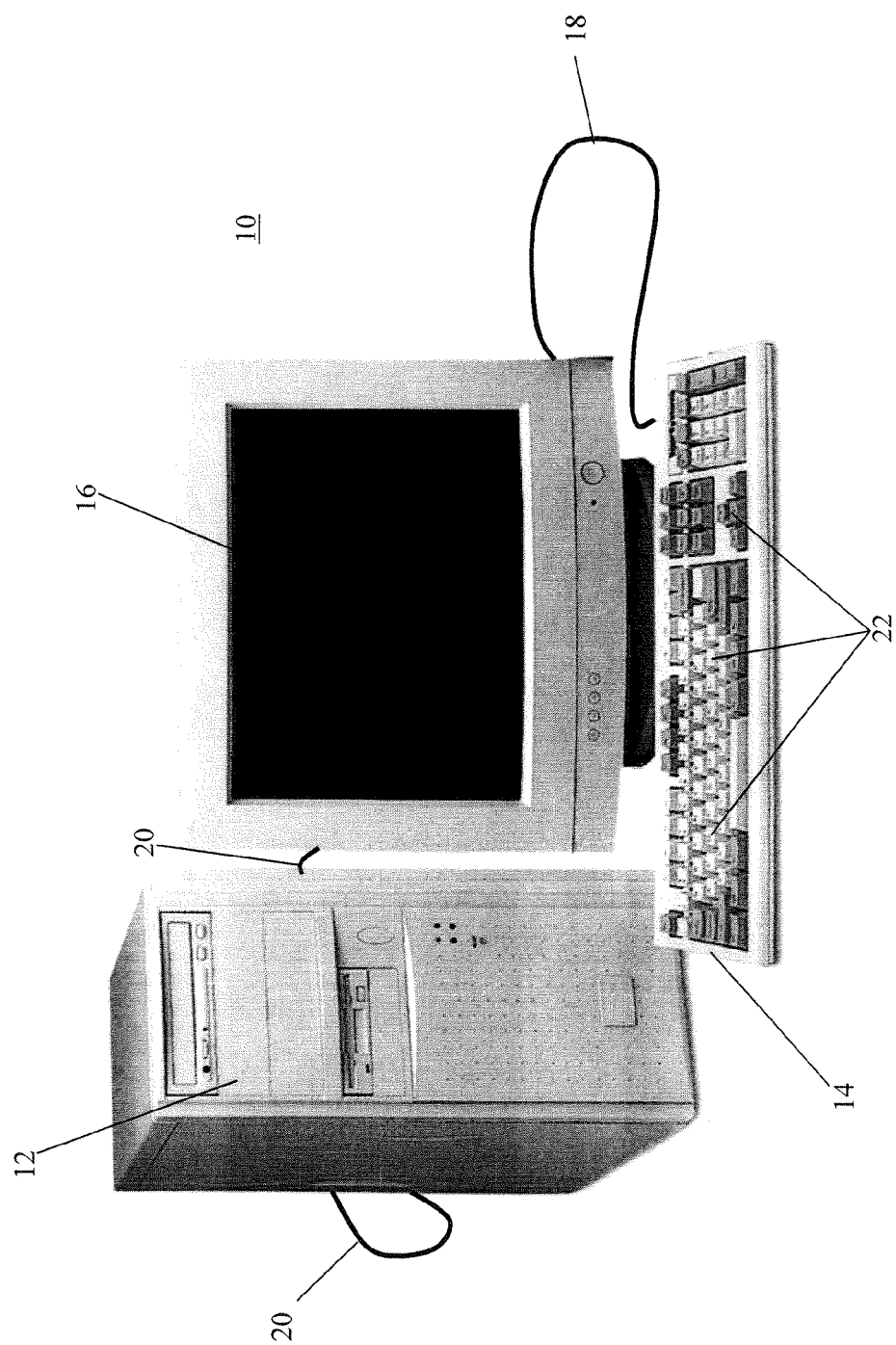
FIG. 1 is a perspective view of a computer system having a computer and a keyboard in accordance with an embodiment of the present invention.

Referring now to FIG. 1, a computer system 10 having a computer 12, a keyboard 14 and a monitor 16 is shown. The keyboard 14 is connected to the computer 12 via a first cable 18 and a connector (not shown) (e.g. a PS/2 or Universal Serial Bus (USB) connector), while the monitor 16 is connected to the computer 12 via a second cable 20. The keyboard 14 includes one or more keys 22. The computer system 10 is arranged, upon user activation of one of the keys 22 to perform a particular function, as will be described in greater detail below.

Although a desktop computer system is shown in the present embodiment, those of skill in the art will understand that the computer system 10 of the present invention is not limited to desktop systems. In alternative embodiments, the computer system 10 may be a laptop computer or a handheld device such as, for example, a Blackberry device. Further, in an alternative embodiment, the keyboard 14 may be wirelessly connected to the computer 12 via short-distance radio technology such as Bluetooth.

Figure 2:
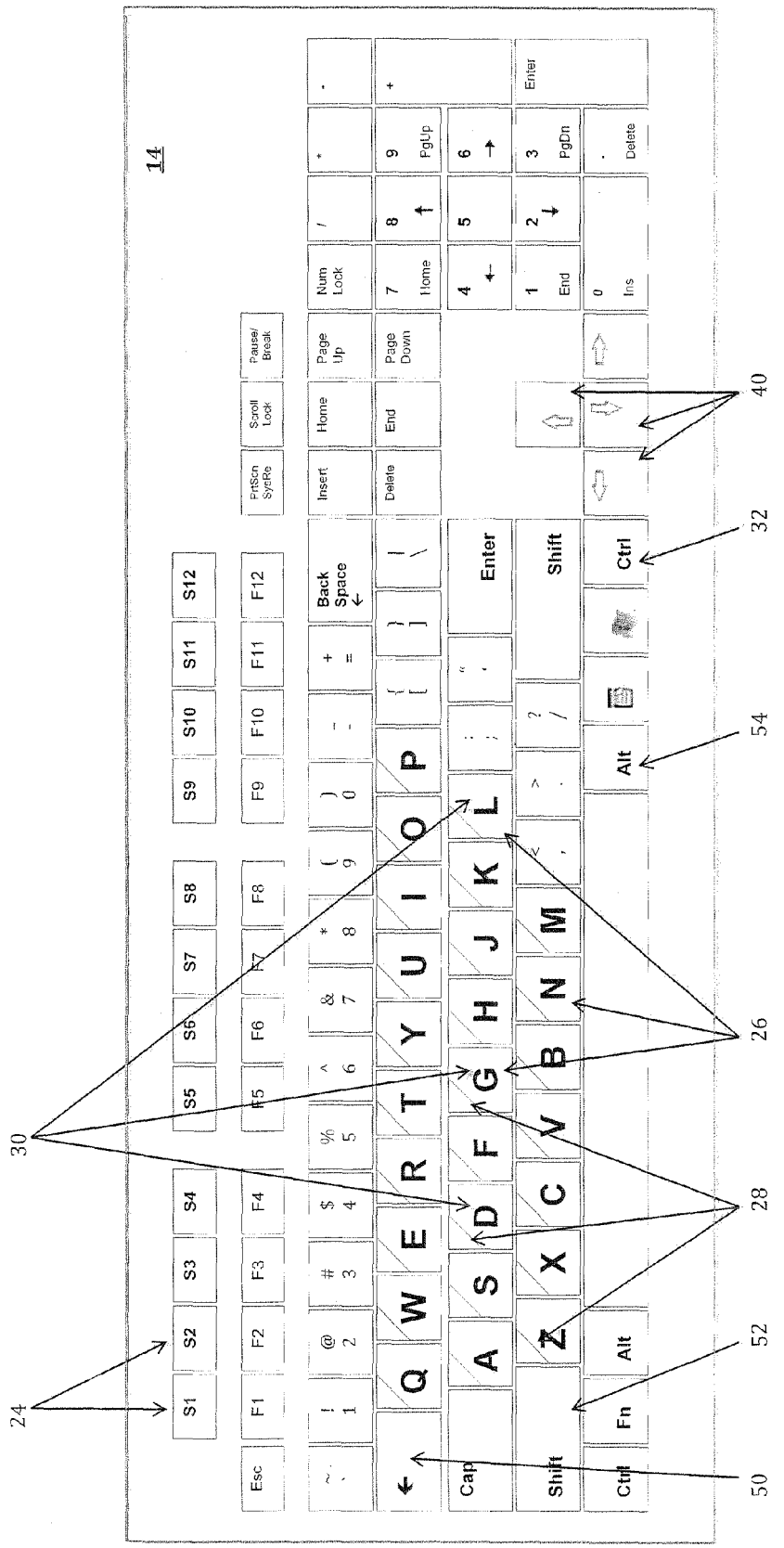
FIG. 2 is a top planar view of the keyboard of FIG. 1.

Referring now to FIG. 2, a top planar view of the keyboard 14 is shown. The keyboard 14 includes one or more function keys 24, a plurality of first letter keys 26 and respective second letter keys 28. Each function key 24 is associated with a set of data including multiple letters. The datasets may include at least one name, address, telephone number, email address, reminder and/or frequently used expression or word.

For example, the function keys 24 may be associated with a user's contact particulars, a list of things to do and/or a frequently used phrase, idiom or word such as "the" or "and". The computer system 10 of FIG. 1 is arranged, upon user activation of one of the function keys 24 to register a selection of the corresponding data set. Each of the first and second letter keys 26 and 28 is associated with a respective letter 30. Although the first and second letter keys 26 and 28 in the present embodiment are arranged in a QWERTY layout, it should be understood that the present invention is not limited by the layout of the first and second letter keys 26 and 28. For example, the first and second letter keys 26 and 28 may be arranged in a Dvorak, ABCDE, XPeRT, QWERTZ or AZERTY layout in alternative embodiments. In one embodiment, the first and second letter keys 26 and 28 are arranged in separate layouts. For example, the first letter keys 26 may be arranged in a QWERTY layout and the second letter keys 28 in a Dvorak layout.

The computer system 10 of FIG. 1 is arranged, upon activation of one of the first letter keys 26, to register the selection of the corresponding letter 30. For example, when a first letter key 26 corresponding to the letter "S" is activated or depressed, a processor (not shown) in the keyboard 14 analyses the key matrix (not shown), that is, the grid of circuits underneath the keys 22, to determine what character content to send to the computer 12. On making a determination, the keyboard 14 sends the character content over to the computer 12 in the form of a signal. The computer 12 processes the signal from the keyboard 14 and displays the letter "S" on the monitor 16.

Figure 3:
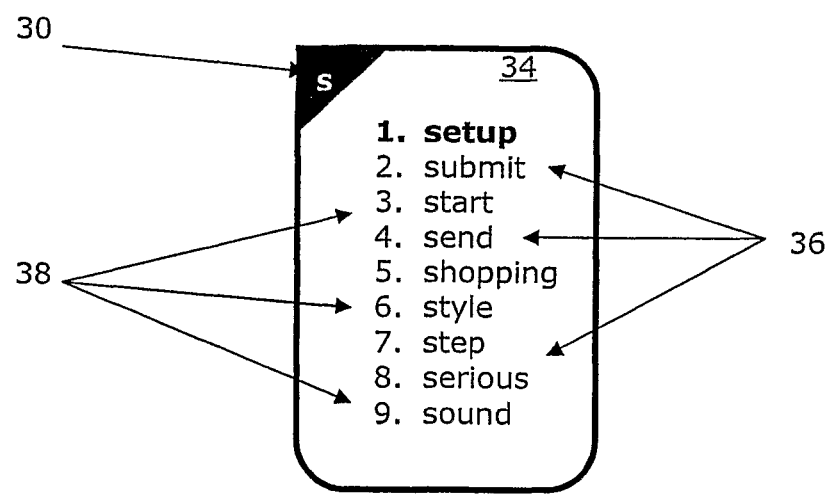
FIG. 3 shows a predefined list of words presented to a user in accordance with one embodiment of the present invention.

In addition, the computer system 10 of FIG. 1 is also arranged to present to the user a predefined list of one or more words upon activation of one of the second letter keys 28. The words of each list presented to the user are associated with the corresponding letter 30. The computer system 10 is further arranged to register a selection by the user of one of the presented words. Referring now to FIG. 3, a predefined list 34 of words 36 presented to the user upon activation of one of the second letter keys 28 on the keyboard 14 is shown. The predefined list 34 of words 36 is displayed on the monitor 16. In the embodiment shown, the predefined list 34 of words 36 is presented to the user when the second letter key 28 corresponding to the letter "S" is activated. As can be seen from FIG. 3, the words 36 of the predefined list 34 are associated with the corresponding letter 30 (i.e. the letter "S"). More particularly, the words 36 of the predefined list 34 begin with the corresponding letter 30. In the embodiment shown, the words 36 in the list 34 are numbered. A selection of one of the presented words 36 may be made by the user by entering the number 38 corresponding to the word 36 selected, highlighting the selected word 36 using arrow keys 40 (see FIG. 2) on the keyboard 14 and entering the highlighted selection, or directing a cursor of a mouse to the selected word 36 and clicking on the selection. In one embodiment, the first word 36 in the presented list 34 is highlighted and in such an embodiment, the user needs only to enter the highlighted word 36 to select the first word 36 in the presented list 34. The selection is registered by the computer system 10 and the selected word 36 is displayed on the monitor 16. Selection of words 36 from a predefined list 34 presented to a user facilitates entry of character content into the application programs on the computer system 10.

Further, the computer system 10 of FIG. 1 is operative to register instructions to alter the list 34 of words 36 associated with any of the letters 30, and upon receiving such instructions to alter the list 34 of words 36 accordingly. For example, alteration to the list 34 of words 36 may be enabled by the user on depressing a control key such as, for example, the "Ctrl" key 32 on the keyboard 14 and one of the second letter keys 28 simultaneously. Upon detecting such a combination of keystrokes, the processor in the keyboard 14 sends a signal to the software which implements the invention to switch the list 34 of words 36 from a read-only mode to an editable mode. Once in the editable mode, the user may then add one or more frequently used words 36 to the list 34, delete one or more words from the list 34 or edit one or more words 36 in the list 34.

Figure 4:
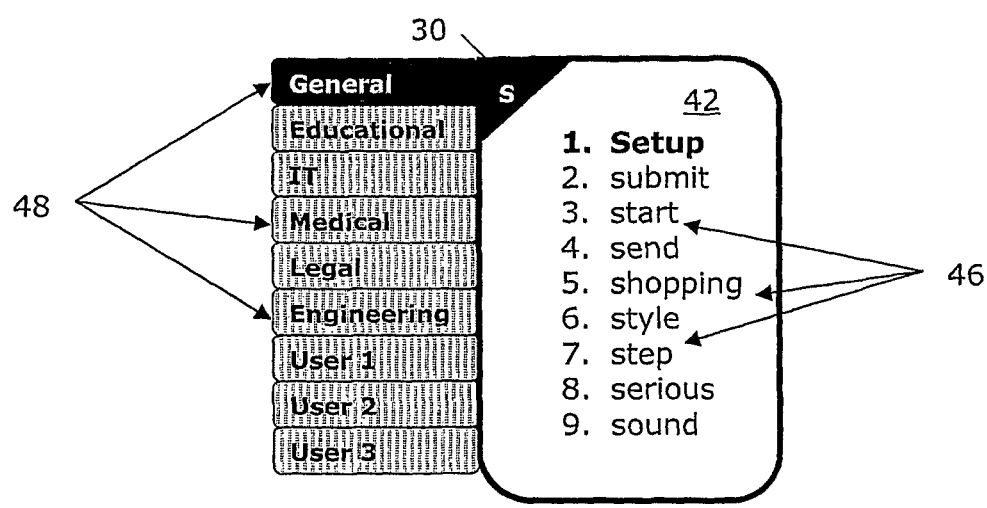
FIG. 4 shows a first word list presented to a user in accordance with a further embodiment of the present invention.
Figure 5:
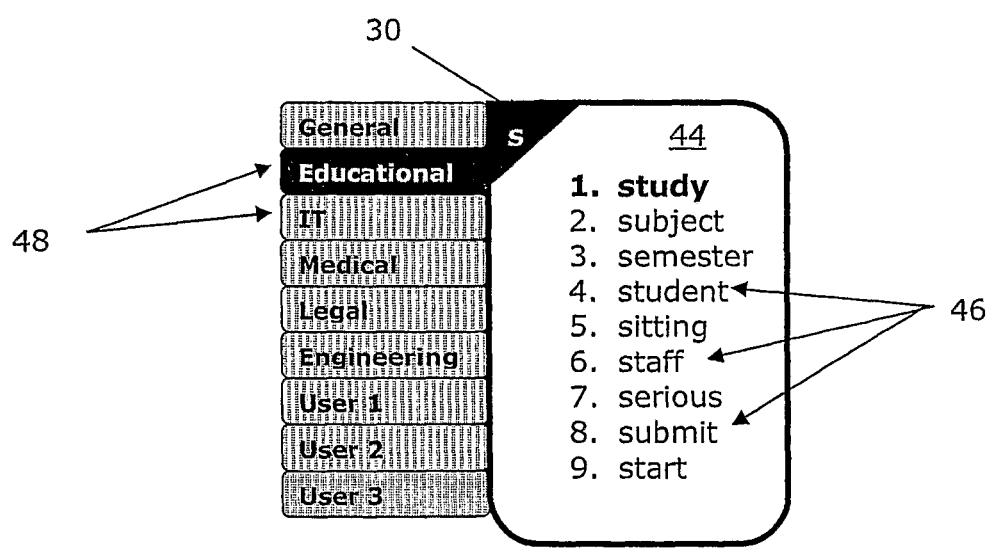
FIG. 5 shows a second word list presented to a user in accordance with a further embodiment of the present invention.

In a further embodiment of the present invention, each of the letters 30 is associated with a corresponding plurality of word lists. In this particular embodiment, the computer system 10 of FIG. 1 is arranged upon selection of one the letters 30, to register at least one command indicating a selection of one of the word lists and associated with that letter 30, and to present the user with the selected word list. The user then makes a selection from the selected word list. An example of multiple word lists associated with a single letter 30 will now be described with reference to FIGS. 4 and 5. FIG. 4 shows a first word list 42 associated with the letter "S", while FIG. 5 shows a second word list 44 associated with the same letter 30. Each word 46 of each word list 42 and 44 is associated with the corresponding letter 30. As can be seen, each of the first and second word lists 42 and 44 is associated with a name 48: the first word list 42 is associated with the name "General", while the second word list 44 is associated with the name "Educational". Although not explicitly shown in FIGS. 4 and 5, there are other word lists associated with the letter "S": there is a word list associated with each of the names 48: "IT", "Medical", "Legal", "Engineering", "User 1", "User 2" and "User 3", shown in FIGS. 4 and 5. The names 48 are editable. A particular word list may be selected by depressing a control key such as, for example, the "Tab" key 50 (see FIG. 2) on the keyboard 14. The provision of multiple word lists 42 and 44 for each letter 30 allows the user to group the words 46 according to genre. In one embodiment, a permanent default word list for all the letters 30 may be set, for example, by depressing and holding one of the control keys, for instance, the "Shift" key 52 (see FIG. 2), followed by one of the second letter keys 28. The default remains until overridden by the selection of another default word list. A session or temporary default word list for all the letters 30 may be set, for example, by depressing and holding another of the control keys, for instance, the "Alt" key 54 (see FIG. 2), followed by one of the second letter keys 28. The default word list is reset when the session expires, for example, when a user logs out. As in previous embodiments, the words 40 in the word lists 42 and 44 are editable. One or more default word lists may be stored for each of multiple different users, so that the user can be presented with his or her corresponding default word list(s). For example, a student may be able to set one or more of the word lists associated with the name 48 "Educational" as default, while a doctor may be able to set one or more of the word lists associated with the name 48 "Medical" as default. Accordingly, when the student logs in, he is presented with his or her corresponding default word list(s), i.e. word list(s) associated with the name 48 "Educational". Similarly, the doctor is presented with word list(s) associated with the name 48 "Medical" when he or she logs in.

Optionally, the embodiment may have a deactivated mode of operation in which the second letters keys are deactivated. This mode of operation may be useful, for example, when an experienced typist is using the keyboard, particularly a typist who is not familiar with the second letter keys. The deactivated mode may be entered by activating a special key (not shown). Alternatively, it may be entered by the user issuing a command to software running on the computer system. The deactivated mode may be exited in a similar way.

Although only a single embodiment of the invention has been described above, many variations are possible within the scope of the invention (in particular, within the invention as defined by the attached claims) as will be clear to a skilled reader.

For example, while the embodiment has been presented above as requiring second letter keys which are in addition to the letter keys of a conventional keyboard (i.e. the first keys), in other embodiments of the invention the second keys may not be provided. Instead, the computer system may display the pre-stored list words or word banks associated with one of the letters (e.g. as shown in FIG. 3 the words associated with the letter "S") upon the user activating (e.g. depressing) one of the first keys and, e.g. at the same time, performing some other activity, such as activating another key (here referred to as a "recall key") which indicates to the computer system that pre-stored words are to be displayed. The recall key is analogous to the conventional "shift" or "alt" key provided on conventional keyboards. Indeed, it would be possible to implement some aspects of the present invention using a conventional keyboard, by designating one of the existing keys of the conventional keyboard as the recall key. In one embodiment, the computer system may display the pre-stored list words or word banks associated with one of the letters upon the user depressing one of the first keys and holding down the first key for a length of time, for example, two (2) seconds. Optionally, this embodiment too may be able to enter temporarily a deactivated mode. For example, a deactivate key may be provided in this case also, so that it may be used to deactivate the ability of the first keys to lead to the display of the pre-stored lists, and then to reactivate this functionality when desired.

Note that in certain embodiments of the invention, the software which implements the invention may be stored within the computer host to which the keyboard is attached (e.g. via a wire in the case that the host is a desktop computer, so that the computer host and the keyboard together form a computer system) or within which the keyboard is incorporated (e.g. in the case that the computer system is a laptop computer). For example, it can be incorporated in the host's driver software for the keyboard. This driver software is preferably configured to operate with any of a number of applications (e.g. all Windows-compatible applications), so that the second keys can be used to input text into any such application.

In case that the keyboard is physically separate from the computer host (e.g. connectable to the computer host via a cable), other embodiments are possible in which a processor which implements the invention is provided within the keyboard, and the word list(s) associated with each letter are stored in a memory device located within the keyboard. This alternative would make it possible for a keyboard to be used with a computer host which only stores conventional driver software. Thus, in response to a user selecting a word from a pre-stored list (e.g. using the second keys) the keyboard may be arranged to transmit to the host data which is equivalent to the data which would have be transmitted if the user had typed the word using only the first keys. Further, the keyboard may be provided with a display area. In such an embodiment, the word list associated with the activated key may be displayed on the keyboard display area and only the selected word is displayed on the computer monitor.

Note that in further possible variations within the scope of the invention, the words listed in the word lists may not be complete words (e.g. words as found in a dictionary) but only the stems of dictionary words, so that the user may add the correct word ending by typing using the first keys, or by selection of a correct ending from a pre-stored list. This is particularly appropriate if the keyboard is used to type a language other than English. Similarly, while it is preferred that the "letters" associated with keys are letters of the Roman alphabet, they may alternatively be letters of other alphabets. In other variations, the selections provided in the word lists may be commonly used phrases such as, for example, "Yours sincerely," or even complete sentences.

Although the word lists presented to a user are described as having one or more words, those of skill in the art will understand that in certain instances (e.g. after the initial installation), the user may be presented with a blank or undefined word list. Words may be then be added to the undefined word list by the user.

It is considered that certain embodiments of the present invention will be of benefit to a typist who, having become familiar with the word lists, will find it faster to input certain words of a text to be input by selection from the word banks, than by typing out all the characters in turn.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

Further, unless the context dearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A computer system having a computer and a keyboard, the keyboard having a plurality of pairs of keys, each pair of keys comprising a first letter key and a respective second letter key, each pair of keys being associated with a single respective letter such that the first letter key and the second letter key of each respective pair together form a respective, otherwise regular key, on the keyboard; the computer system being arranged such that:
(i) upon activation of one of the first letter keys, to register a selection of the corresponding single letter, a user can type a text by consecutively striking the first letter keys corresponding to consecutive letters of the text; and
(ii) upon activation of one of the second letter keys, a user is presented with a predefined list of one or more words, the words of each list being associated with the corresponding single letter, the computer system being arranged to register a selection by enabling the user to select one of the presented words;
wherein, for each pair of keys, the first letter key neighbors the second letter key such that the first letter key is immediately adjacent the second letter key of the pair, with no intervening keys.

2. The computer system according to claim 1, wherein the second letter keys can be deactivated.

3. The computer system according to claim 1, wherein at least some of the letters are associated with a corresponding plurality of word lists, each word of each word list being associated with the corresponding single letter, the computer system being arranged upon activation of one of the second letter keys, to register at least one command indicating a selection of one of the word lists associated with that single letter, and to present the user with the selected word list, whereby the user can make a selection from the selected word list.

4. The computer system according to claim 1, wherein the computer system is operative to register instructions to alter the list of words associated with any of the letters, and upon receiving such instructions to alter the list of words accordingly.

5. The computer system according to claim 1, wherein each of the word lists is associated with a name, the names being editable.

6. A computer system having a computer and a keyboard, the keyboard having a plurality of pairs of keys, each pair of keys comprising a first letter key and a respective second letter key, each pair of keys being associated with a single respective letter such that the first letter key and the second letter key of each respective pair together form a respective, otherwise regular key, on the keyboard;
the computer system being arranged such that:
(i) upon activation of one of the first letter keys, to register the selection of a corresponding single letter, whereby a user can type a text by consecutively striking once the first letter keys corresponding to consecutive letters of the text; and
(ii) upon activation of one of the second letter keys, a user is presented with a predefined list of one or more words, the words of each list beginning with the corresponding single letter, the computer system being arranged to register a selection by enabling the user to select one of the presented words;
wherein, for each pair of keys, the first letter key neighbors the second letter key such that each of the first letter keys is immediately adjacent the second letter key, with no intervening keys.

7. The computer system according to claim 6, wherein the second letter keys can be deactivated.

8. The computer system according to claim 6, wherein at least some of the letters are associated with a corresponding plurality of word lists, each word of each word list being associated with the corresponding single letter, the computer system being arranged upon activation of one of the second letter keys, to register at least one command indicating a selection of one of the word lists associated with that letter, and to present the user with the selected word list, whereby the user can make a selection from the selected word list.

9. The computer system according to claim 6, wherein the computer system is operative to register instructions to alter the list of words associated with any of the letters, and upon receiving such instructions to alter the list of words accordingly.

10. The computer system according to claim 6, wherein each of the word lists is associated with a name, the names being editable.

11. A keyboard having a plurality of pairs of keys, each pair of keys comprising a first letter key and a respective second letter key, each pair of keys being associated with a respective single letter such that the first letter key and the second letter key of each respective pair together form a respective, otherwise regular key, on the keyboard, and at least one of the first and second letter keys of each respective pair being labelled with the respective single letter;
wherein, for each pair of keys, the first letter key neighbors the second letter key such that the first letter key is immediately adjacent the second letter key of the pair, with no intervening keys;

whereby when the keyboard is used as part of a computer system, the computer system is arranged such that:
(i) upon activation of one of the first letter keys, to register a selection of a corresponding single letter, a user can type a text by consecutively striking the first letter keys corresponding to consecutive letters of the text; and
(ii) upon activation of one of the second letter keys, a user is presented with a list of one or more words, the words of each list being associated with the corresponding single letter, whereby the computer system is arranged to register a selection by enabling the user to select one of the presented words.

12. The keyboard according to claim 11, wherein the list of words corresponding to each letter are words that begin with the corresponding single letter.

13. The keyboard according to claim 11, wherein the keyboard further comprises one or more third keys, each third key being associated with a set of data include multiple letters, whereby the keyboard can be used as part of a computer system which is arranged, upon user activation of one of the keys to register a selection of the corresponding data set.

14. The keyboard according to claim 13, wherein at least one of the datasets comprises at least one name, address, telephone number, and/or email address.

* * * * *